Patented July 10, 1951

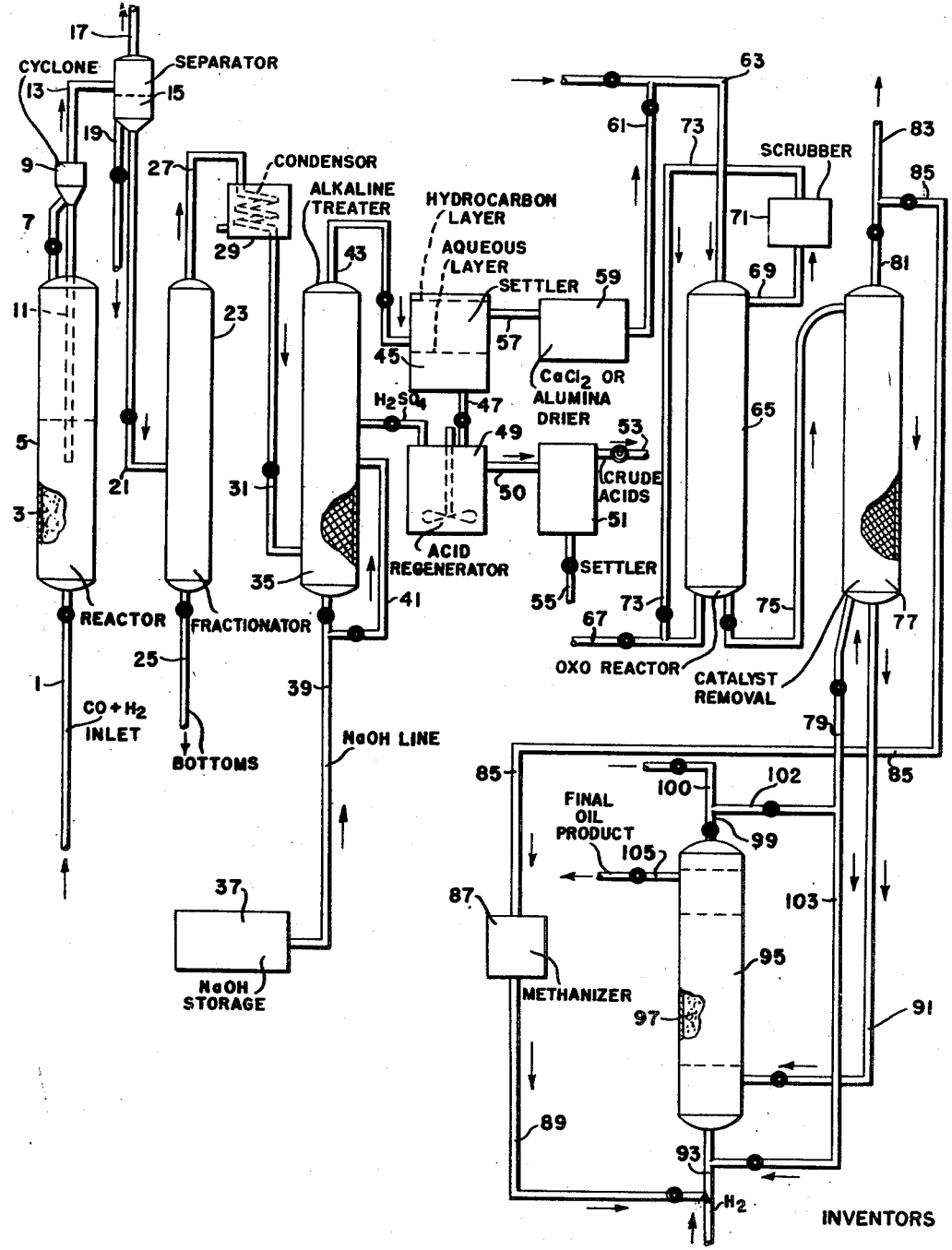

2,560,360

UNITED STATES PATENT OFFICE 2,560,360

SYNTHESIS OF OXYGENATED ORGANIC COMPOUNDS

Joseph K. Mertzweiller and John J. Owen, Baton Rouge, La., assignors to Standard Oil Development Company, a corporation of Delaware Application June 11, 1947, Serial No. 753,978

15 Claims. (Cl. 260—632)

The present invention relates to the production of oxygenated organic compounds by the reaction of olefins with hydrogen and carbon monoxide and more specifically to the preparation of improved olefinic feed stocks for processes of this type. In particular, the invention refers to the production of oxygenated organic compounds from olefins obtained by the catalytic conversion of carbon monoxide and hydrogen and to improvements in the preparation of such olefins for the purpose of producing oxygenated organic compounds therefrom.

It is well known in the art that oxygenated organic compounds may be synthesized from olefins or diolefins by a reaction with carbon monoxide and hydrogen in the presence of catalysts containing cobalt, iron, nickel or the like in a two-step process in which predominantly aldehydes and ketones and minor proportions of alcohols are formed in a first step in the presence of the catalysts mentioned above and the product from the first step is hydrogenated in a second step to convert aldehydes and ketones into the corresponding alcohols. The catalyst used in the first stage may be employed in the second stage. However, other known hydrogenation catalysts may be used in the latter stage such as metallic nickel, nickel supported on kieselguhr, and others. The catalyst for the first stage usually contains promoters such as thoria, magnesia and the like.

The alcohols produced by this process normally contain one more carbon atom than the olefin used as the starting material, the position of the added hydroxyl group depending on the positions of the double bond in the olefins. The olefins to be used as starting material may therefore be selected as a function of the purpose for which the product alcohol is desired.

For example, a detergent such as sodium lauryl sulfate may be prepared from an olefin such as undecene-1 by the alcohol synthesis. Other olefins and diolefins such as ethylene, propylene, butylene, pentenes, hexenes, butadiene, pentadienes, olefin polymers, such as diisobutylene, triisobutylene, polybutylenes and olefinic fractions from thermal or catalytic cracking operations and other sources may be used as starting material depending on the nature of the aldehydes and alcohols desired. The olefins fed may comprise pure olefins or hydrocarbon mixtures containing olefins. In general, olefins having from 2 to 18 carbon atoms and more particularly from 8 to 18 carbon atoms, in the molecule are preferred.

The synthesis gas mixture containing hydrogen and carbon monoxide may be produced from any conventional sources such as carbonaceous solids or gases in any manner known per se and in any desired ratio of hydrogen to carbon monoxide. Ratios of 0.5 volume of hydrogen to 4.0 volumes of hydrogen per volume of carbon monoxide may be employed, about 1.0 volume of hydrogen per volume of carbon monoxide being preferred. The reaction of the olefins with $H_2$ and CO is generally conducted at pressures in the range of about 100 to 300 atmospheres and temperatures in the range of about 150° F. to 450° F.

The quantity of $H_2$+CO with respect to olefins used may vary within wide ranges, for example from 1000 to 45,000 cu. ft. of $H_2$+CO per barrel of olefin fed. In general, approximately 2,500 to 15,000 cu. ft. of $H_2$+CO per barrel of olefin feed are employed. In the hydrogenation step temperatures are generally within the range of from about 150° F. to 450° F. while pressures within the range of about 100 to 300 atmospheres are suitable.

The catalysts for the first stage of the process are usually employed in the form of salts of the catalytically active metal with high molecular weight fatty acids such as stearic, palmitic, oleic, naphthenic, linoleic, and similar acids of natural or synthetic origin. For example, metal soaps such as cobalt stearate, nickel oleate, cobalt naphthenate, and iron linoleate are suitable catalysts. These salts are soluble in the liquid olefin feed and may be supplied to the reaction zone in the form of hydrocarbon solutions or dissolved in the olefin feed.

Prior to the present invention, attempts have been made to utilize as starting materials for the process described above, olefins produced by the catlytic conversion of carbon monoxide with hydrogen over catalysts such as iron promoted with alkali metal compounds, or similar promoters. However, these attempts have not been successful because olefin conversion in the first olefin oxygenation stage and selectivities toward the formation of alcohols are so low that the process based on synthetic olefins of this type becomes uneconomical. It is the principal object of the present invention to provide a procedure by which this difficulty may be overcome and synthetic olefins may be converted into useful starting materials for the production of oxygenated organic compounds by the conversion of such olefins with carbon monoxide and hydrogen.

Our investigations have indicated that the difficulties arising in connection with the use of synthetic olefins as starting materials for the production of oxygenated organic compounds are connected with the presence of certain oxygenated compounds particularly acidic materials introduced into these olefins by the original synthesis reaction. Therefore, the invention relates in its broadest aspect to the production of oxygenated organic compounds from synthetic olefins which have been subjected to a treatment adapted substantially completely to free said olefins of synthetic acidic materials.

More specifically, the process of the invention comprises a treatment of synthetic olefins with the hydroxides or oxides of the alkali or alkaline earth metals whereby acidic constituents are removed from the olefins, and the use of the thus purified olefins for the production of oxygenated organic compounds by the catalytic reaction with carbon monoxide and hydrogen. The alkaline treating materials may be employed in solution or in solid form at normal atmospheric or elevated temperatures. For example, caustic soda solutions of 1 to 20 per cent, preferably 3 to 15% are suitable for the purposes of the invention at treating temperatures of about 50° to 300° F. preferably about 50° to 100° F. It has been found that the yields of oxygenated organic compounds and the alcohol selectivities of the process using synthetic olefins alkali-treated in accordance with the present invention are satisfactory for commercial operation.

The present invention will be best understood from the more detailed description hereinafter wherein reference will be made to the accompanying drawing, the single figure of which is a schematical illustration of a system suitable for carrying out a preferred embodiment of the invention.

Referring now in detail to the drawing, the numeral 5 indicates a conventional fluid type catalytic synthesis reactor for the conversion of carbon monoxide with hydrogen in the presence of finely divided synthesis catalyst. Reactor 5 contains a dense turbulent fluidized mass 3 of a synthesis catalyst, preferably an iron catalyst such as sintered pyrites ash promoted with about 1.5 per cent of potassium fluoride. Synthesis feed gas containing carbon monoxide and hydrogen is supplied from line 1 to reactor 5 at a suitable synthesis pressure of 5 to 50 atmospheres, preferably 15 to 40 atmospheres. The synthesis temperature may be maintained within the approximate limits of 500° to 800° F., preferably between about 550° and 700° F. by conventional methods of heat removal (not shown). Other details of the operation of fluid synthesis reactors using iron catalysts are well known and need not be further specified here.

The total product of the synthesis reaction is withdrawn from reactor 5 through line 7 and passed to a conventional gas solids separator 9 wherein entrained catalyst fines may be separated from the product vapors and gases and returned through return pipe 11 to the catalyst mass 3 in reactor 5. Product vapors and gases substantially free of entrained catalyst are passed through line 13 to a separator 15 wherein the separation of liquids and gases and of a hydrocarbon layer from an aqueous layer is accomplished by cooling and settling. Gas is withdrawn overhead through line 17 to be either recycled to reactor 5 or passed to a conventional gas recovery plant (not shown). The aqueous layer containing the water-soluble oxygenated products is withdrawn from the bottom of separator 15 through line 19.

The total liquid hydrocarbon oil product containing olefins and oil-soluble organic compounds is withdrawn from an upper liquid layer within separator 15 and passed through line 21 to a conventional fractionating column 23. The hydrocarbons are fractionated in column 23 so as to recover heavy bottoms withdrawn through line 25 and an olefinic fraction of the boiling range desired for the production of oxygenated organic compounds. This fraction preferably has a relatively narrow boiling range of about 50° to 100° F. falling within the approximate limits of 100° to 600° F., preferably 250° to 400° F., depending on the molecular weight and character of the oxygenated compounds desired as the final product of the process.

The overhead from fractionator 23 passes through line 27 to a condenser 29 and from there in liquid form through line 31 to the alkali treating chamber 35. The treating chamber 35 preferably contains a porous packing of refractory materials or the like such as Raschig rings, Berl saddles, etc. An alkaline solution of the desired strength is supplied to treating chamber 35 from alkali storage tank 37 through lines 39 and/or 41. Treating chamber 35 is preferably maintained at a temperature of 50° to 300° F. and may be operated at any desired pressure. On their way through treating chamber 35 the olefinic feed and the alkaline treating solution are thoroughly mixed in any conventional manner and intimately contacted so as to assure substantially complete removal of the acids contained in the hydrocarbon feed in the form of organic salts of the metal of the alkaline treating agent.

A mixture of treated hydrocarbons and spent treating agent is withdrawn from treating chamber 35 through line 43 and passed to a settler 45 wherein it is separated into an aqueous bottom layer and oil top layer. The aqueous bottom layer containing excess alkaline treating agent and organic salts of its metal is withdrawn through line 47 and passed to an organic acid regenerator 49 wherein it is treated with a strong inorganic acid, preferably sulfuric acid to set free the organic acids. The acid mixture is passed from regenerator 49 through line 50 to a settler 51 wherein it is separated into a top layer containing the crude organic acids which may be withdrawn through line 53 and a bottom layer containing the neutral organic salt produced in regenerator 49. The bottom layer may be discarded through line 55.

Returning now to settler 45 the hydrocarbon layer is withdrawn through line 57 and dried in drier 59 with conventional drying agents such as calcium chloride, alumina, or other dehydrating agents and/or adsorbents.

The dried liquid olefinic hydrocarbons pass from drier 59 through line 61 to a pipe 63 wherein they are mixed with a catalyst promoting the conversion with carbon monoxide and hydrogen into oxygenated organic compounds. Any conventional type catalyst such as cobalt stearate or naphthenate may be used in proportions varying between about 0.1 and 5.0 per cent by weight of olefins. The mixture of olefinic feed stock and catalyst is passed to an upper portion of primary reactor 65 to be converted into oxygenated organic compounds primarily aldehydes and ketones.

Simultaneously, a gas mixture containing hydrogen and carbon monoxide in the approximate ratio of 0.5–2.0 volumes of hydrogen per volume of carbon monoxide is supplied through line 67 to the bottom portion of primary reactor 65. Reactor 65 is preferably operated at a pressure of about 3000 pounds per square inch and at a temperature of about 250° to 400° F. Liquid and gases flowing countercurrently through reactor 65 are intimately contacted therein. Unreacted gas is withdrawn overhead through line 69, scrubbed in scrubber 71 of entrained liquid and catalyst in the form of metal carbonyl, and preferably recycled through line 73 to gas feed line 67.

Liquid oxygenated reaction products and unreacted olefins are withdrawn from a bottom portion of reactor 65 through line 75 and passed to a catalyst removal zone 77 which is packed with a catalytically inert solid material such as ceramic Raschig rings, kieselguhr, pumice, charcoal or silica gel, etc. Hydrogen recovered from a later stage of the process, as will appear hereinafter, may be supplied to zone 77 through line 79 and passed through zone 77 countercurrently to the liquid oxygenated product. Catalyst removal zone 77 is preferably maintained at a temperature of about 200° to 450° F. at which the catalyst which enters zone 77 predominantly in the form of metal carbonyl dissolved in the liquid product is decomposed into metal and carbon monoxide. The metal is deposited on the inert packing within zone 77 while the carbon monoxide is purged by the hydrogen. A mixture of hydrogen and carbon monoxide is withdrawn through line 81 either to be discarded through line 83 or to be passed through line 85 to a methanizer 87 wherein the carbon monoxide is converted thermally or catalytically into methane in any conventional manner. The methane and hydrogen may be passed through line 89 to hydrogenation reactor 95.

The liquid oxygenated product now free of oxygenation catalyst is withdrawn from zone 77 through line 91 and passed to a bottom portion of hydrogenation reactor 95. Simultaneously, hydrogen is supplied to reactor 95 through line 93 in proportions sufficient to convert the aldehydes and ketones contained in the oxygenated feed into the corresponding alcohols. Reactor 95 contains a mass 97 of any conventional hydrogenation catalyst. For example, when nickel is employed as the hydrogenation catalyst, reactor 95 may be operated at pressures ranging from about 300 to 3000 pounds per square inch, at temperatures of about 300° to 400° F. and at an $H_2$ rate of about 5000 to 20,000 normal cu. ft. per bbl. of feed. The catalyst may be employed in the form of fixed or moving beds, or it may be suspended in the liquid feed. Details of hydrogenation processes of this type are well known in the art and need not be further specified. Unreacted hydrogen may be withdrawn overhead from reactor 95 through line 99 and either vented through line 100 or recycled through line 102 via lines 79 and/or 103 to the catalyst removal zone 77, as previously described, or hydrogenation reactor 95.

The hydrogenated product stream is withdrawn from reactor 95 through line 105. This product which is now highly concentrated in the desired alcohols may be passed to any conventional product recovery plant (not shown).

The system illustrated by the drawing permits of various modifications. Fixed or moving bed reactors may be used in place of fluid synthesis reactor 5 in any manner known per se. Other synthesis catalysts promoting the formation of liquid olefins from carbon monoxide and hydrogen may replace the iron catalysts specified. The alkaline treating agent in treating chamber 35 may be solid rather than a liquid. Other conventional oxygenating catalysts than those specified may be supplied to line 63. For example, insoluble finely divided metal catalysts may be used in aqueous or oil suspension. Instead of nickel, other hydrogenation catalysts such as tungsten, or sulfides of metals of groups VI and VIII of the periodic table may be utilized. Further modifications may occur to those skilled in the art without deviating from the spirit of the invention.

The invention will be further illustrated by the following specific examples.

*Example I*

An olefinic feed stock was prepared as follows:

A total hydrocarbon product was synthesized by passing a feed consisting primarily of hydrogen and carbon monoxide in a volume ratio of 2:1 over an iron catalyst containing 1.5% alumina and about 1.5% potassia at 650° F. and 400 p. s. i. g. This product was fractionated in conventional apparatus and a fraction boiling in the range of 250°–300° F. was collected for further treatment.

Inspection of this fraction showed the following values:

| | |
|---|---:|
| Gravity, °A. P. I. | 53.4 |
| Hydroxyl number | 9 |
| Carbonyl number | 274 |
| Saponification number | 42 |
| Acid number | 32.8 |
| Bromine number | 92 |

A sample of this fraction was treated with 5 per cent caustic soda solution at 70°–90° F. for 12 minutes. The treated product showed the following inspection data:

| | |
|---|---:|
| Gravity, °A. P. I. | 56.5 |
| Hydroxyl number | 23 |
| Carbonyl number | 33 |
| Saponification number | 11 |
| Acid number | 0.9 |
| Bromine number | 88 |

The estimated olefin content was changed from about 73% in the untreated fraction to about 70 per cent in the treated fraction.

A sample of the untreated fraction was reacted in an autoclave with CO and $H_2$ at the conditions and with the results given below using a catalyst consisting of 31.2% Co, 0.9% Cu, 5.6% $ThO_2$, 62.3% silica.

| | Aldehyde stage |
|---|---:|
| Catalyst concentration, wt. per cent | 11 |
| Volume ratio $H_2/CO$ in gas | 1.2 |
| Duration of test, hours | 5 |
| Temperature, °F. | 275 |
| Pressure, p. s. i. g. | 3000 |
| Olefin conversion, wt. per cent | 16 |
| Gravity of product, °A. P. I. | 49.8 |

Because of the extremely low yield of oxygenated product the latter was not subjected to hydrogenation.

A sample of the alkali treated fraction was converted using the same catalyst at the conditions and with the results given below:

| | Aldehyde Stage | Hydrogenation Stage |
|---|---:|---:|
| Catalyst Concentration, Wt. Per Cent | 12 | [1] 20 |
| Volume Ratio $H_2/CO$ In Gas | 1.2 | |
| Duration of Test Hours | 5 | 12 |
| Temperature, °F. | 275 | 350 |
| Pressure, p. s. i. g. | 3,000 | 2,700 |
| Olefin Conversion, Wt. Per Cent | 86 | |
| Inspection of Product: | | |
| Gravity, °A. P. I. | 37.3 | |
| Hydroxyl Number | 35 | 210 |
| Carbonyl Number | 197 | 1 |

[1] Nickel on kieselguhr used as catalyst in hydrogenation stage.

A comparison of the results reported above indicates that the treatment of the synthetic olefins with alkali in accordance with the present invention leads to about a 5-fold increase in olefin conversion.

Example II

A synthetic olefin fraction boiling between 350° and 400° F. was obtained from an oil produced as described in Example I.

This fraction had the following inspection data:

| | |
|---|---|
| Gravity, °A. P. I. | 41.7 |
| Hydroxyl number | 18 |
| Carbonyl number | 112 |
| Saponification number | 46 |
| Acid number | 34.8 |
| Bromine number | 54 |

A sample of this fraction was treated with a 10 per cent caustic soda solution at a temperature of 70°–90° F. for 12 minutes. The treated sample showed the following inspection data:

| | |
|---|---|
| Gravity, °A. P. I. | 44.3 |
| Hydroxyl number | 17 |
| Carbonyl number | 33 |
| Saponification number | 13 |
| Acid number | 0.1 |
| Bromine number | 57 |

The estimated olefin content was changed by the alkali treatment from about 58% in the untreated fraction to about 61% in the treated fraction.

A sample of the untreated fraction was converted with hydrogen and carbon monoxide using the oxygenated catalyst specified in Example I at the conditions and with the results given below.

| | Aldehyde stage |
|---|---|
| Catalyst concentration, wt. per cent | 11 |
| Volume ratio, $H_2/CO$ in gas | 1.2 |
| Duration of test, hours | 5 |
| Temperature, °F | 350 |
| Pressure, p. s. i. g. | 3000 |
| Olefin conversion, wt. per cent | 6 |
| Gravity of product, °A. P. I. | 40.4 |

The small amount of oxygenated product formed was not hydrogenated.

The treated sample was oxygenated using the same catalyst at the conditions and with the results given below.

| | Aldehyde Stage | Hydrogenation Stage [1] |
|---|---|---|
| Catalyst Concentration, Wt. Per Cent | 9 | 9 |
| Volume Ratio of $H_2/CO$ in Gas | 1.2 | |
| Duration of Test, Hours | 5 | 12 |
| Temperature, ° F | 350 | 350 |
| Pressure, p. s. i. g. | 3,000 | 2,700 |
| Olefin Conversion, Wt. Per Cent | 77 | |
| Inspections of Product: | | |
| Hydroxyl Number | | 156 |
| Carbonyl Number | | 2 |

[1] The oxygenation catalyst was used in the hydrogenation stage.

A comparison of the above results shows that the alkali treatment of these synthetic olefins in accordance with the present invention permits about a 13-fold increase of the olefin conversion into oxygenated products.

It should be understood that the slight deviations in the oxygenation conditions of the experiments reported above have little or no influence on olefin conversion.

While the the foregoing description and exemplary operations have served to illustrate specific applications and results of the invention, other modifications obvious to those skilled in the art are within the scope of the invention. Only such limitations should be imposed on the invention as are indicated in the appended claims.

We claim:

1. The process of producing oxygenated organic materials which comprises subjecting to a treatment with an alkaline treating agent olefins produced by the catalytic conversion of CO with $H_2$ in the presence of a hydrocarbon synthesis catalyst, said treatment being adapted to remove acidic materials from said olefins, and contacting said treated olefins with $H_2$ and CO in the presence of an oxygenation catalyst at oxygenation conditions to produce oxygenated organic materials.

2. The process of claim 1 in which said treating agent comprises caustic alkali.

3. The process of claim 1 in which said treating agent comprises a compound selected from the group consisting of the oxides and hydroxides of the alkaline earth metals.

4. The process of claim 1 in which said alkaline treating agent is in the form of an aqueous solution.

5. The process of claim 4 in which said solution contains about 3–15% of NaOH.

6. The process of claim 1 in which said olefins are treated with said treating agent at temperatures of 50° to 300° F.

7. The process of claim 1 in which said oxygenated materials are hydrogenated in the presence of a hydrogenation catalyst and at hydrogenation conditions of temperature and pressure conducive to the conversion of aldehydes and ketones contained in said materials into the corresponding alcohols.

8. The process of claim 1 in which said hydrocarbon synthesis catalyst is an iron-type catalyst and said catalytic conversion is carried out at temperatures of about 500°–800° F. and pressures of about 5–50 atmospheres.

9. The process of producing oxygenated organic materials which comprises contacting a gas mixture containing CO and $H_2$ in synthesis proportions at synthesis conditions of temperature and pressure with a synthesis catalyst promoting the formation of normally liquid olefinic hydrocarbons at said synthesis conditions, recovering synthetic olefins, treating said recovered olefins with an alkaline treating agent at conditions adapted to neutralize organic acids contained in said olefins to form organic salts, separating said salts from said olefins, contacting said separated olefins with CO and $H_2$ at oxygenation conditions of temperature and pressure and in the presence of an oxygenation catalyst, adapted to convert said olefins into oxygenated compounds, and recovering said oxygenated compounds.

10. The process of claim 9 in which said synthesis catalyst is an iron-type catalyst, said synthesis temperature is about 500°–800° F., said synthesis pressure about 5–50 atmospheres, and said synthesis proportions about 0.5–3 volumes of $H_2$ per volume of CO.

11. The process of claim 9 in which said separated olefins are dried prior to their contact with said CO and $H_2$.

12. The process of claim 9 in which said salts are converted with a strong inorganic acid into organic acids and inorganic salts of said inorganic acids; and said organic acids are recovered.

13. The process of claim 9 in which said syn-product of said synthesis reaction.

14. The process of claim 13 in which said distilled synthetic olefins have a boiling range bethetic olefins are recovered by distilling the total tween about 200° to about 600° F.

15. The process of claim 14 in which said boiling range is a narrow range of about 50°–100° F. falling within the broad range of from about 250° to about 400° F.

JOSEPH K. MERTZWEILLER.
JOHN J. OWEN.

REFERENCES CITED

The following references are of record in the file of this patent:

UNITED STATES PATENTS

| Number | Name | Date |
| --- | --- | --- |
| 1,984,884 | Lazier | Dec. 18, 1934 |
| 2,171,324 | Zetzsche et al. | Aug. 29, 1939 |
| 2,327,066 | Roelen | Aug. 17, 1943 |
| 2,360,787 | Murphree et al. | Oct. 17, 1944 |
| 2,437,600 | Gresham et al. | Mar. 9, 1948 |

OTHER REFERENCES

Brennstoff-Chemie, vol. 16, No. 20 (1935), pages 382–387 (article by Koch et al.).

U. S. Naval Technical Mission in Europe. Technical Report No. 248–45, "The Synthesis of Hydrocarbons and Chemicals from CO and $H_2$," pages 29, 30, 118 and 119. September 1945.

Refiner and Natural Gasoline Manufacturer, vol. 17, No. 2, February 1938, page 50 (article by Naphtali).